United States Patent
Lee et al.

(10) Patent No.: US 7,304,773 B2
(45) Date of Patent: Dec. 4, 2007

(54) LOCKING APPARATUS FOR A MOVABLE CARRY MODULE

(75) Inventors: Ta-Yi Lee, Chung-Ho (TW); Hsuan Lin, Yuanlin Township, Changhua County (TW); Eric Liu, Banciao (TW)

(73) Assignee: Lite-On Technology Corporation, Taipei (TW)

( * ) Notice: Subject to any disclaimer, the term of this patent is extended or adjusted under 35 U.S.C. 154(b) by 628 days.

(21) Appl. No.: 10/834,254

(22) Filed: Apr. 29, 2004

(65) Prior Publication Data

US 2005/0241351 A1    Nov. 3, 2005

(51) Int. Cl.
*H04N 1/04* (2006.01)
(52) U.S. Cl. ............ 358/474; 358/497; 358/482; 358/483

(58) Field of Classification Search ............ 358/471, 358/474, 497, 400, 500, 505; 399/211, 212; 250/234–236, 239, 216; 359/896; 74/89.39
See application file for complete search history.

(56) References Cited

U.S. PATENT DOCUMENTS

| | | | |
|---|---|---|---|
| 6,529,294 B1* | 3/2003 | Chang | 358/471 |
| 6,700,717 B2* | 3/2004 | Lee | 359/896 |
| 7,133,145 B2* | 11/2006 | White et al. | 358/1.14 |

\* cited by examiner

*Primary Examiner*—Cheukfan Lee
(74) *Attorney, Agent, or Firm*—Rabin & Berdo, P.C.

(57) ABSTRACT

A locking apparatus for a movable carry module, comprises a controller using to fix the movable carry module of an electric device. The controller has a movable locking shaft normality stretch in the movable carry module, and applies to fix the movable carry module. The electric device supplies the electric power to the controller when receiving the external electric power, and then the locking shaft departs from the movable carry module, such that the movable carry module can move freely.

5 Claims, 6 Drawing Sheets

LOCKING APPARATUS FOR A MOVABLE CARRY MODULE

FIELD OF THE INVENTION

The present invention relates to a locking apparatus adopted for use on an electric device such as scanner, multi-function peripheral (MFP) and the like, and particularly to latch an optical module of a scanner to prevent scanning operation before the latch condition is released.

BACKGROUND OF THE INVENTION

In the digital technology area, the development of photoelectric technology has spawned many different electric devices such as scanners, digital cameras, digital video cameras, and the like. The scanner can rapidly transform paper documents to electronic files, hence is widely used in paperless office environments.

A conventional scanner includes at least a case, a lid, an optical module and a transmission mechanism. The case has a scan window. The lid is pivotally coupled on one side of the case in a movable manner. The optical module and the transmission mechanism are located in the case. The optical module is mounted onto a carrier. The transmission mechanism is coupled with the carrier for moving the optical module to and reciprocally within the range of the scan window. Because the optical module determines the quality of the scanning result of the scanner, and the optical module is a movable mechanism, to prevent the optical module from undue vibration during transportation or carrying, resulting in focus error or damage, scanner manufacturers usually include a latch coupler on the carrier of the optical module. Before the scanner is shipped from the plant, the carrier is anchored by the latch coupler, to prevent the optical module from being damaged during transportation or carrying. Users have to remove the latch coupler before use at the first time, otherwise the scanner cannot perform a scanning operation.

Although scanner manufacturers have clearly marked or noted to remind users to remove the latch coupler before use, many users still neglect this procedure. They could start the scanner without removing the latch coupler. As a result, the transmission mechanism or the optical module could be damaged.

To remedy this problem, some vendors have installed the latch coupler on the case close to the connection port. When the latch coupler latches the carrier, it also covers the connection port, so that users have to remove the latch coupler to connect the flat cable or power cord to the connection port. This scheme can prevent users from starting the scanner before the latch coupler has been removed. However, such a design aims to prevent damages during transportation for vendors and the mistaken first time operation of users. When users move the scanner themselves after first installation, they do not always remember to latch the latch coupler again, or try to omit this step to save the trouble of removing and reconnecting the connection line. Hence this is not a desirable design.

SUMMARY OF THE INVENTION

In view of the foregoing concerns, the present invention aims to provide a locking apparatus for a movable carry module that can automatically restrict the motion of the carry module according to the power supply condition of the electric device, so that electronic elements such as the optical module on the carry module may be prevented from being damaged.

The locking apparatus according to the invention mainly includes a controller, which has a locking shaft. The locking shaft is extended into the movable carry module to prohibit the movable module from moving. Namely, when the electric device is not in use or being transported, the movable carry module may be mounted securely on the electric device through the controller. When the electric device is in use, connecting to city power energizes it. The electric power is also transferred to the controller through the electric device to unlatch the locking shaft from the movable carry module, so that the movable module is moved as desired to perform scanning operation.

The foregoing, as well as additional objects, features and advantages of the invention will be more readily apparent from the following detailed description, which proceeds with reference to the accompanying drawings.

DESCRIPTION OF THE PREFERRED EMBODIMENTS

The present invention aims to provide a locking apparatus for a movable carry module to be adopted for use on an electric device such as a scanner. While the following embodiments use the scanner as an example, it is not a limitation. Other electric devices that have a movable carry module, which requires to be latched to prevent moving during transportation or being damaged, and the latch, to be released before the electric device is operated, are within the covering scope of the present invention.

Figure 1A:
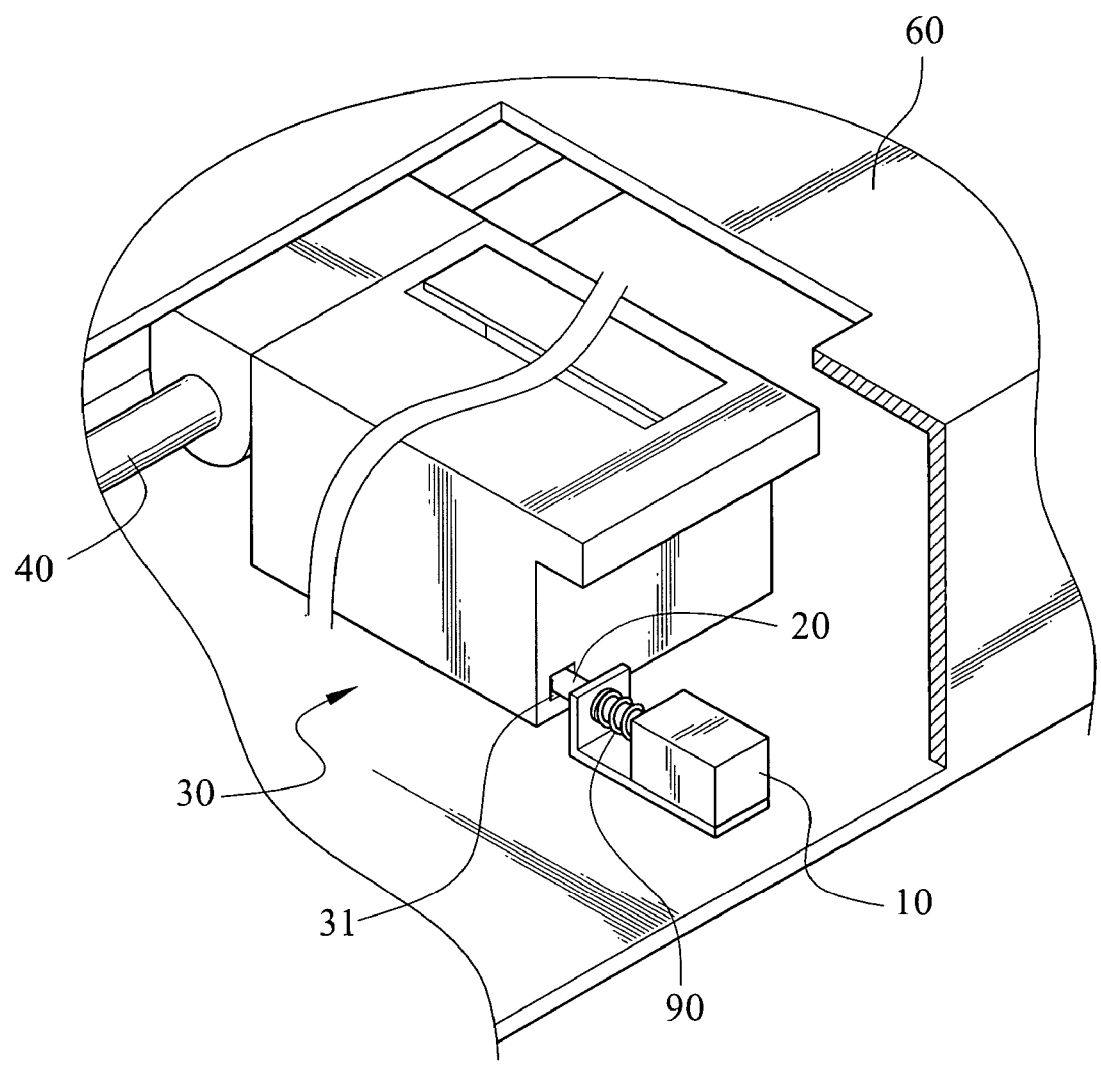
FIGS. 1A and 1B are schematic views of a first embodiment of the locking apparatus of the invention.
Figure 1B:
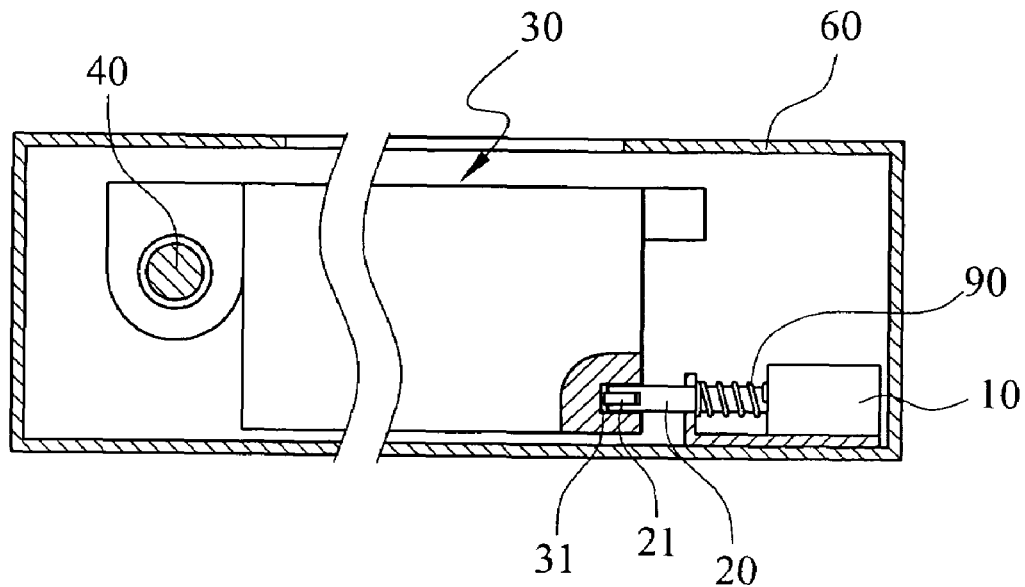

Referring to FIGS. 1A and 1B, the locking apparatus according to the invention is adopted for use on an electric device such as a scanner 60. The scanner 60 includes at least a guiding rod 40 and a movable carry module 30. The movable carry module 30 carries an optical module (not shown in the drawings) which consists of electronic elements. The movable carry module 30 is driven by a transmission mechanism (not shown in the drawings) to move linearly and reciprocally on the guiding rod 40. The optical module scans scanning objects such as documents. The image scanning technology is well developed and known in the art, and forms no part of the invention, thus this portion is omitted in the further discussion.

The locking apparatus according to the invention includes a controller 10. The controller 10 has a movable-locking shaft 20, which has a roller 21 at one end. The controller 10 is connected electrically to the scanner 60, and is actuated by system power supply 'ON' and 'OFF' of the scanner 60 to control the moving condition of the locking shaft 20. In addition, the movable carry module 30 has a cavity 31 corresponding to the locking shaft 20.

Figure 2B:
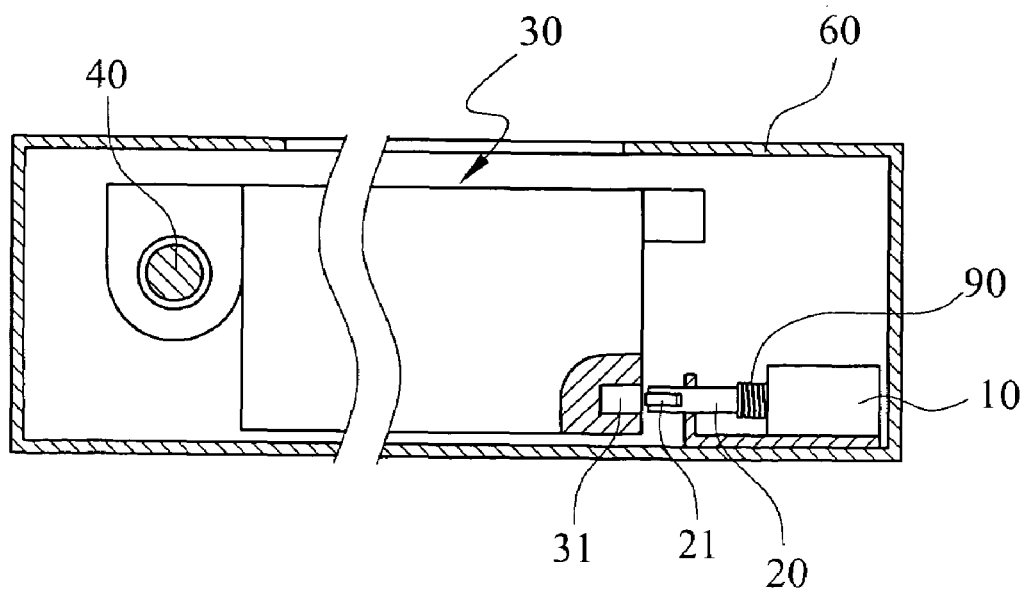
FIGS. 2A and 2B are schematic views of the first embodiment of the invention in operating condition.
Figure 2A:
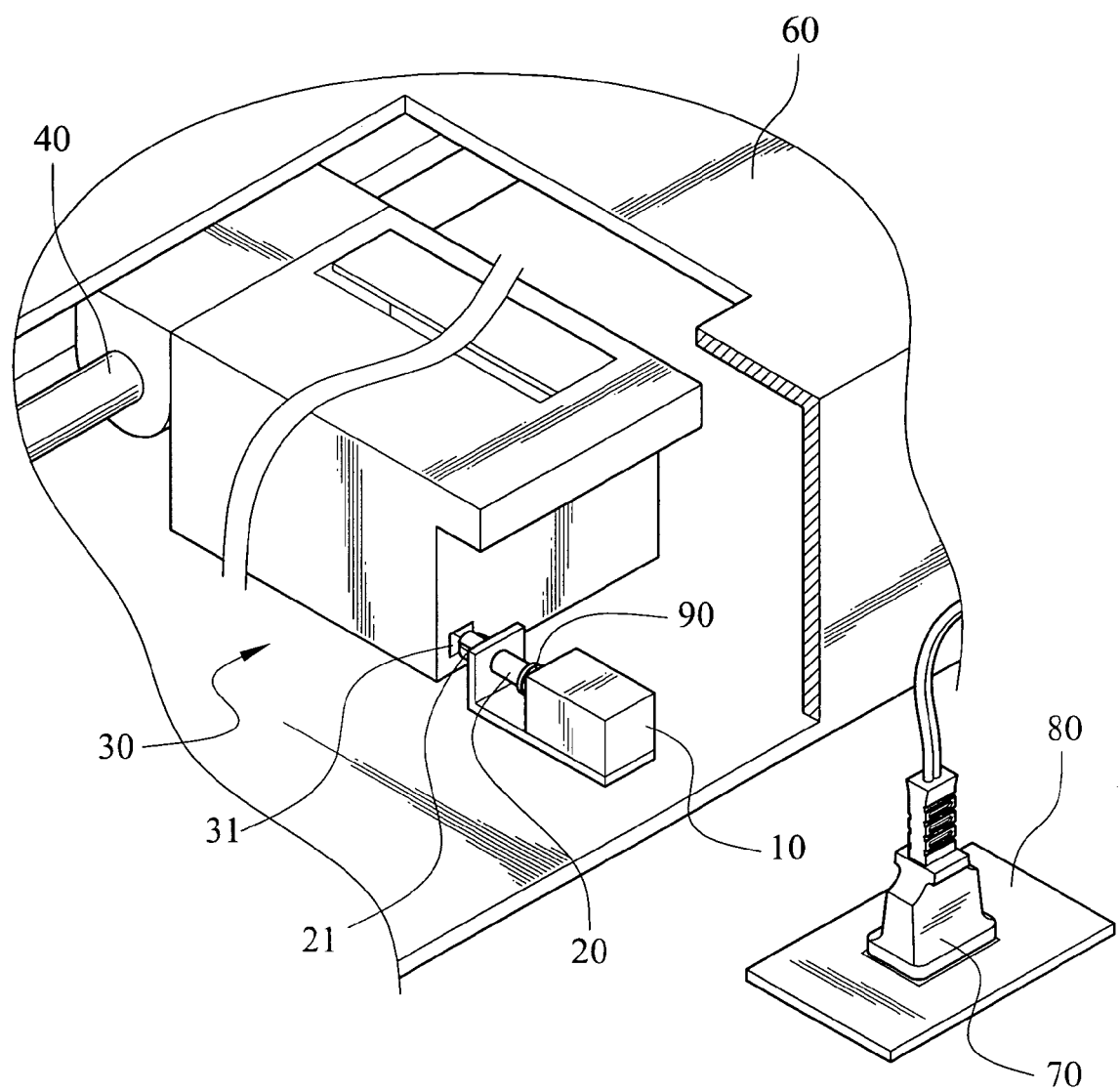

In general, when an electric device such as a scanner 60 is not yet plugged in the power supply socket of city power, or the power supply socket is plugged but the power supply switch is OFF, the movable carry module 30 is at a preset idling position. The locking shaft 20 of the controller 10 is extended into the cavity 31 of the movable carry module 30 in normal condition, to restrict the moving range of the movable carry module 30. Thereby, a electric device such as a scanner 60 may be prevented from impact of external forces during transportation and anchored securely to avoid damage The locking shaft 20 is coupled with a spring 90 which is compressed and provides a returning elastic force to push the locking shaft 20, so that the locking shaft 20 does not escape the cavity 31 when the scanner 60 is shaken under external forces. Referring to FIGS. 2A and 2B, when the power supply plug 70 of an electric device such as a scanner 60 is connected to the power supply socket 80 of the city power, or the power supply switch is 'ON', electric power is also supplied to the controller 10. The locking shaft 20 is driven by the magnetic force generated by a solenoid valve (not shown in the drawings) in the controller 10 to compress the spring 90 and escapes the cavity 31. Hence the movable carry module 30 is free from the harness of the locking shaft 20 and may be moved freely. The roller 21 on the locking shaft 20 makes the shaft 20 easier to move in and out of the cavity 31. The solenoid valve in the controller 10 is a technique known in the art and forms no part of the invention, thus its details are omitted from further discussion.

Figure 3A:
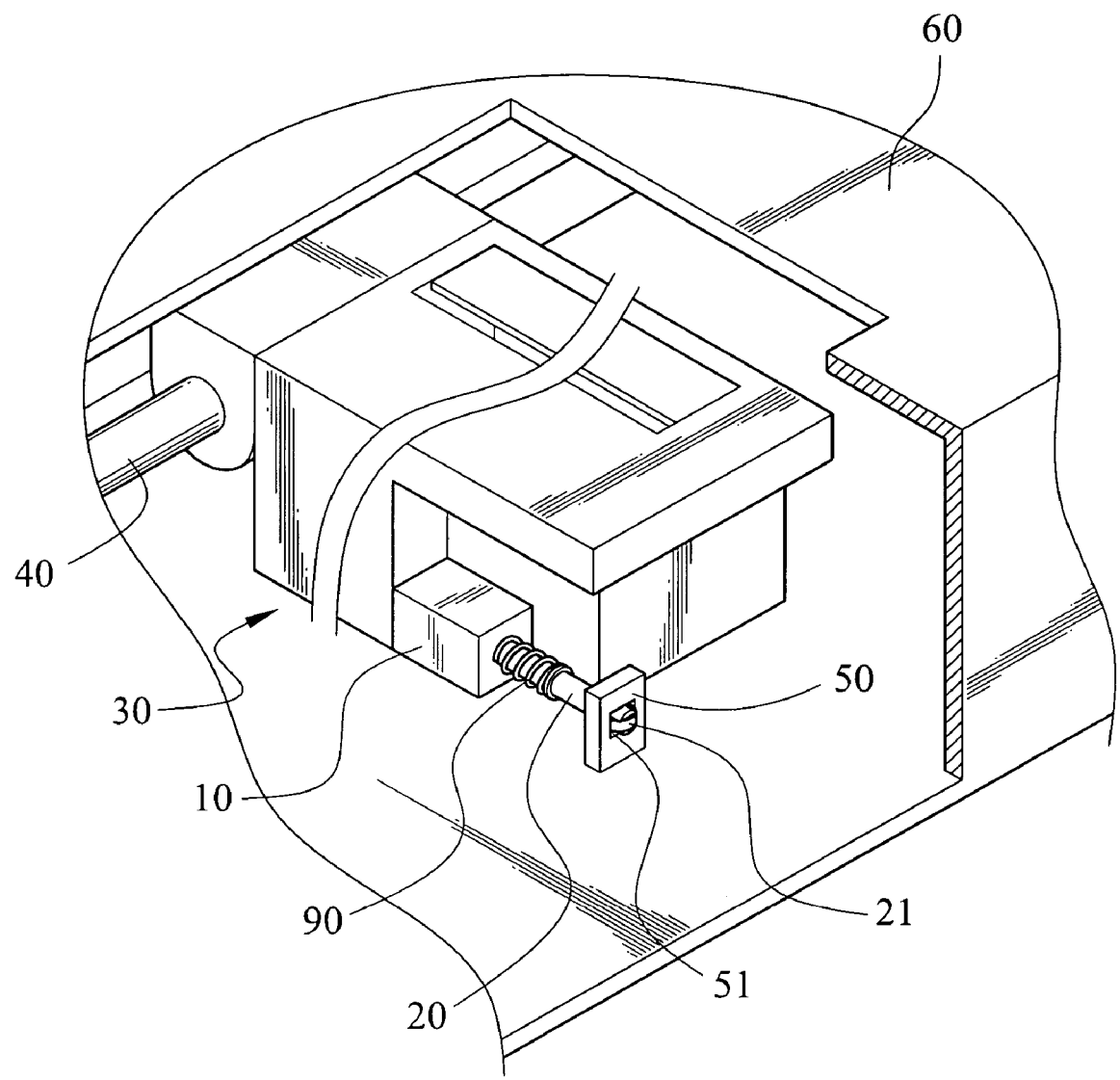
FIGS. 3A and 3B are schematic views of a second embodiment of the locking apparatus of the invention.
Figure 3B:
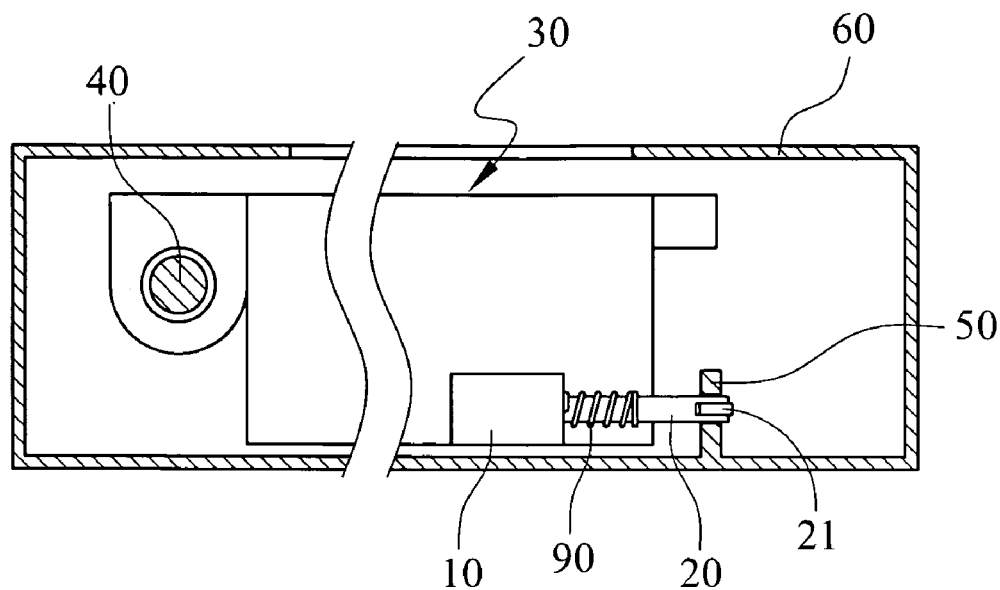

The controller 10, besides being located on an electric device such as a scanner 60, may also be located on the movable carry module 30 to achieve the function of restricting the motion of the movable carry module 30. Refer to FIGS. 3A and 3B for a second embodiment of the invention. In this embodiment, the controller 10 is located on the movable carry module 30. When the power supply plug of the electric device such as the scanner 60 is not connected to the power supply socket of the city power, or the power supply socket is plugged but the power supply switch is OFF, the movable carry module 30 is at a preset idling position. The scanner 60 has an anchor member 50 corresponding to the controller 10. The anchor member 50 has a trough 51 to receive the locking shaft 20. The locking shaft 20 is pushed by the spring 90 to extend and insert into the trough 51 in normal condition, to restrict the moving range of the movable carry module 30. Thereby, when an electric device such as a scanner 60 is not in use or from being transported, the movable carry module 30 may be secured without being damaged.

Figure 4B:
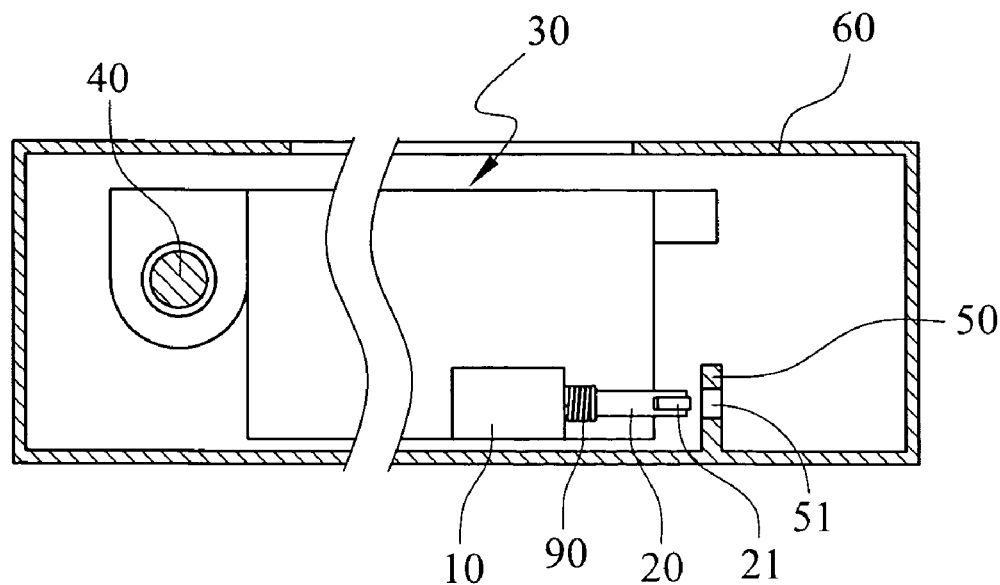
FIGS. 4A and 4B are schematic views of the second embodiment of the invention in operating condition.
Figure 4A:
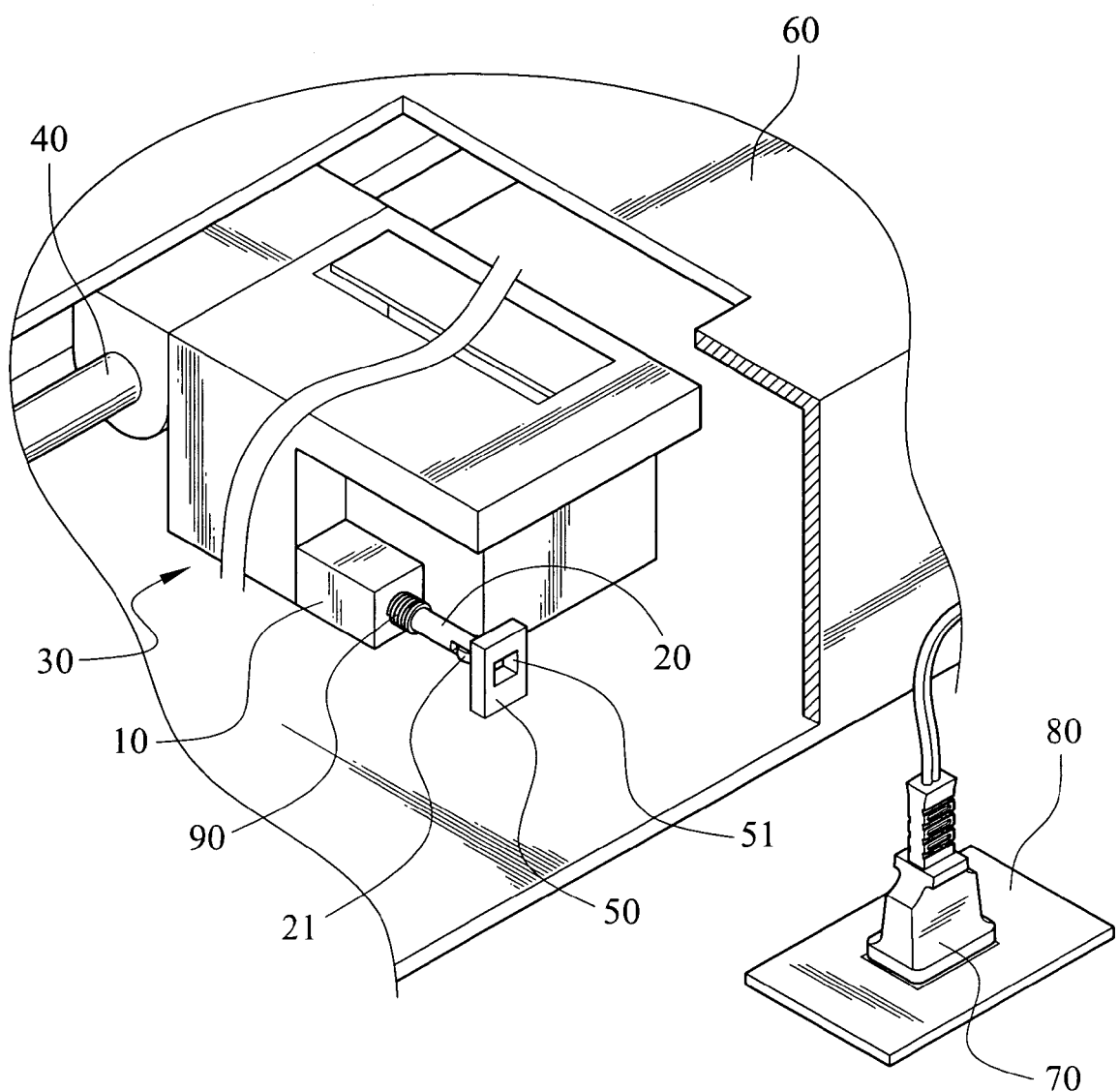

Referring to FIGS. 4A and 4B, when the power supply plug 70 of the electric device such as the scanner 60 is connected to the power supply socket 80 of the city power, or the power supply switch is ON, electric power is also supplied to the controller 10. The locking shaft 20 is driven by the magnetic force generated by a solenoid valve (not shown in the drawings) in the controller 10, to overcome the compression force of the spring 90 and escape the trough 51. Hence the movable carry module 30 is free from the harness of the locking shaft 20 and may be moved freely. The roller 21 on the locking shaft 20 makes the locking shaft 20 easier to move in and out of the trough 51.

In summary, the locking apparatus according to the invention can move away the locking shaft 20 of the controller 10 to release the locking relationship with the movable carry module 30 while the system power supply of the scanner 60 is activated, so that the movable carry module 30 becomes movable freely. In addition, when the scanner 60 is not in use or during transportation, the locking shaft 20 can restrict the moving range of the movable carry module 30 and establish a locking relationship between the movable carry module 30 and the scanner 60.

Based on the previous discussion, it is clear that the invention can automatically alter the operation of the controller through the system power supply condition. This is a user-friendly operation. Namely, when users switch the power supply ON or OFF, they can also control the latch condition of the movable carry module. This has a simpler structure and costs less. Thus it offers significant improvement of conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A locking apparatus for a movable carry module located in an electric device to fix the movable carry module, the movable carry module having a cavity, comprising:
   a controller; and
   a locking shaft movably located in the controller, the locking shaft having a roller mounted on one end thereof to facilitate moving in and out of the cavity, the locking shaft being receivable in the cavity of the movable carry module;
   wherein the locking shaft is extended into the cavity of the movable carry module in a normal condition to prevent the movable carry module from moving, and the locking shaft is retracted from the cavity of the movable carry module when the electric device is connected to a power source and the controller is energized by electricity at the same time, such that the movable carry module is movable.

2. The locking apparatus of claim 1, wherein the locking shaft is a cylindrical strut.

3. A locking apparatus for a movable carry module located in an electric device to fix the movable carry module, comprising:
   a controller;
   a locking shaft movably located in the controller; and
   an anchor member located in the electric device corresponding to the locking shaft;
   wherein the locking shaft is extended in the anchor member in a normal condition to prevent the movable carry module from moving, and the locking shaft escapes the anchor member when the electric device is connected to a power source, and the controller is energized by electricity at the same time such that the movable carry module is movable.

4. The locking apparatus of claim 3, wherein the anchor member has a trough corresponding to the locking shaft for receiving the locking shaft.

5. The locking apparatus of claim 4 wherein the locking shaft has a roller mounted on one end thereof to facilitate moving in and out of the trough.

* * * * *